UNITED STATES PATENT OFFICE.

SAMUEL TULLAR, OF WARDEN, QUEBEC, CANADA.

STAIN FOR BRICK-WORK.

SPECIFICATION forming part of Letters Patent No. 383,330, dated May 22, 1888.

Application filed January 16, 1888. Serial No. 260,933. (No specimens.)

*To all whom it may concern:*

Be it known that I, SAMUEL TULLAR, of Warden, in the county of Shefford, and Province of Quebec, Canada, have invented a certain new and useful Improved Preparation for Staining and Preserving Brick-Work; and I do hereby declare that the following is a full, clear, and exact description of the same.

The object of my invention is not only to impart to the face of brick-work a fuller and richer tint than that of the natural brick, but also to form over the surface of such brick-work a glaze or coating which will resist the action of the elements and prevent exfoliation.

The preparation to which I add the coloring matter desired (made of any known commercial article for the purpose, such as Venetian red) is composed of a solution of salt and alum, to which is added a small proportion of spirits of niter. The proportions will be approximately as follows: water, eight gallons; salt, two gallons, by measure; alum, two pounds; spirits of niter, four ounces. The alum and salt will be thoroughly dissolved in the water, the coloring-matter introduced, and the spirits of niter added, the whole being incorporated together and laid on with a brush.

It will of course be understood that the proportion of coloring-matter will depend upon the depth of the shade desired and on the ingredients used.

What I claim is as follows:

As a preparation for staining and preserving brick-work, the combination, with coloring-material, of a solution of salt and alum and spirits of niter, in the proportions set forth.

SAMUEL TULLAR.

Witnesses:
JOHN C. TULLAR,
C. M. B. TARTRE.